Dec. 19, 1933.  D. G. SORBER  1,940,192
APPARATUS FOR FREEZING CANNED GOODS
Filed Nov. 9, 1931  5 Sheets-Sheet 1
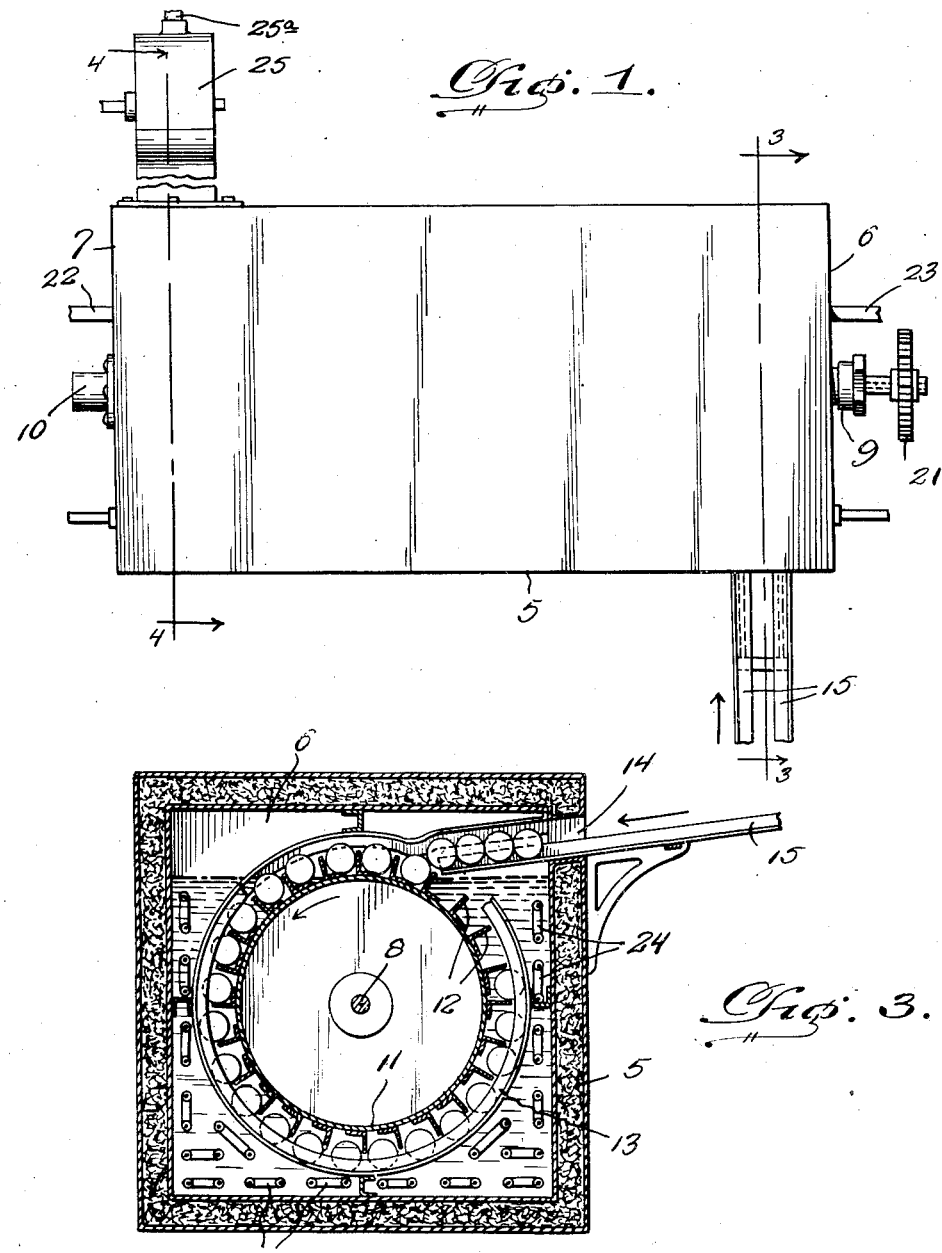
Daniel G. Sorber,
INVENTOR.
BY J. Stanley Burch
ATTORNEY.

Dec. 19, 1933.　　　D. G. SORBER　　　1,940,192
APPARATUS FOR FREEZING CANNED GOODS
Filed Nov. 9, 1931　　　5 Sheets-Sheet 2
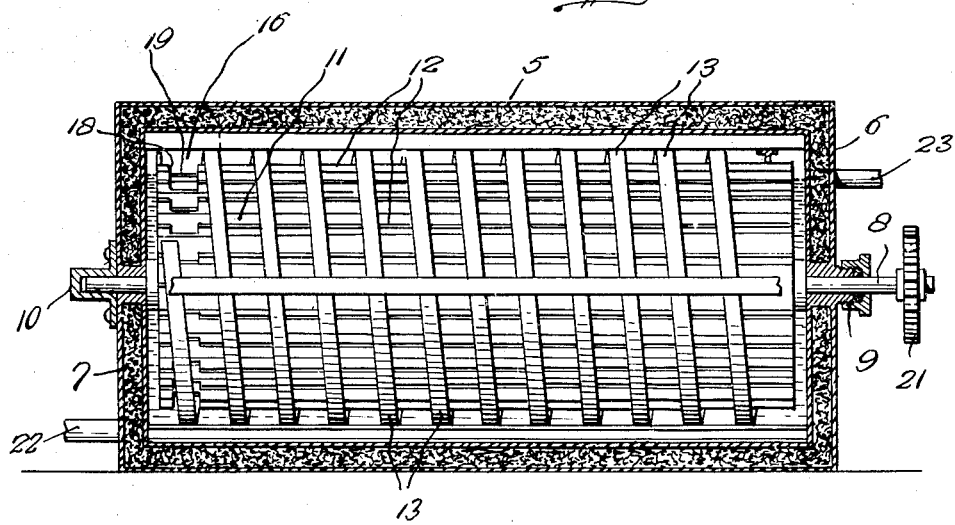
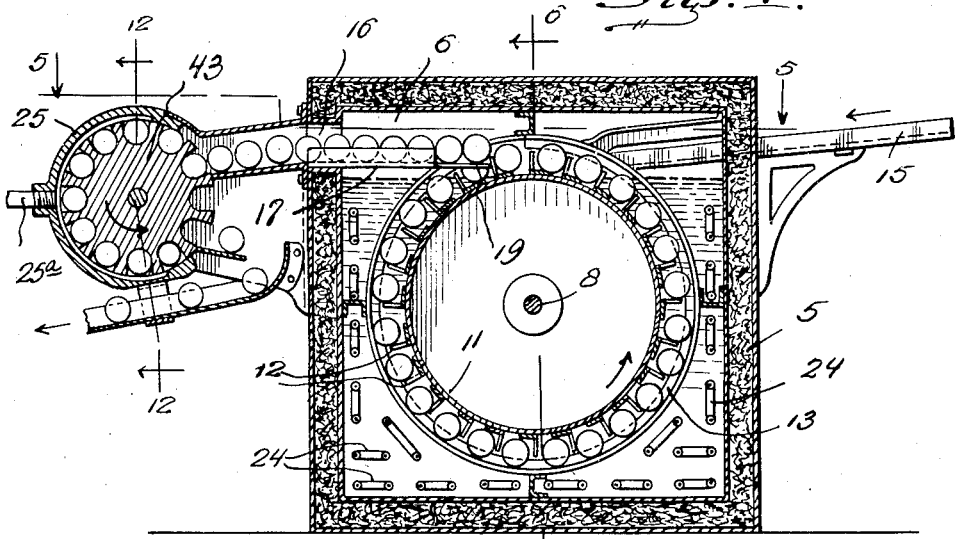
Daniel G. Sorber,
INVENTOR.
BY J. Stanley Burch
ATTORNEY.

Dec. 19, 1933.  D. G. SORBER  1,940,192
APPARATUS FOR FREEZING CANNED GOODS
Filed Nov. 9, 1931  5 Sheets-Sheet 3
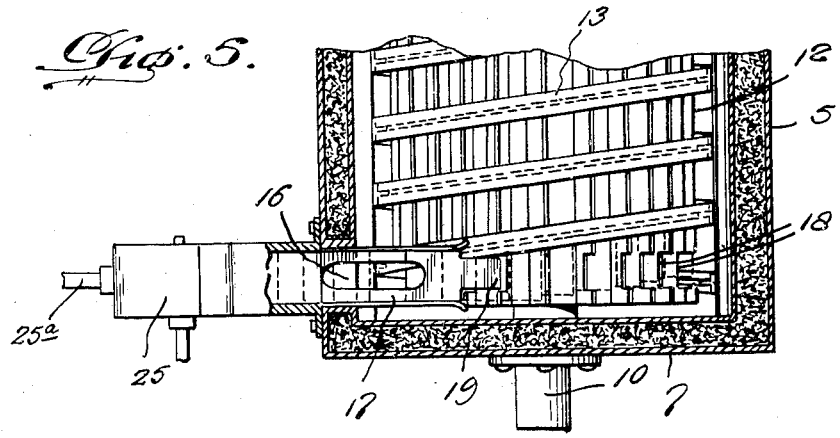
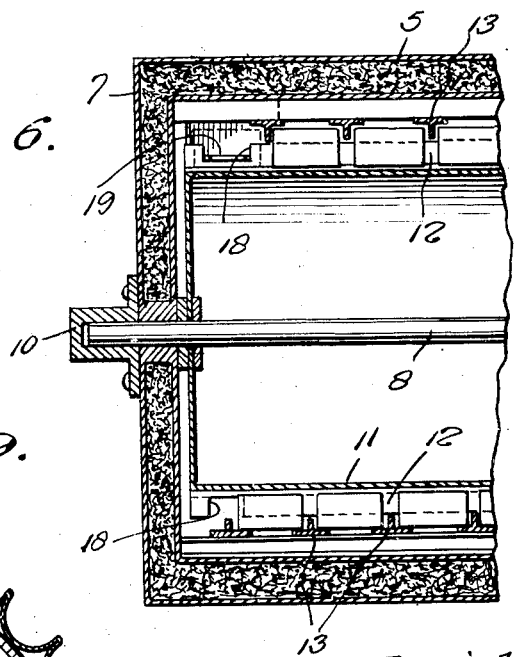
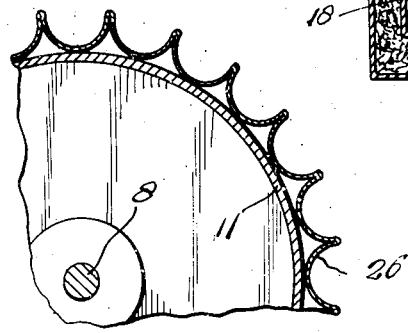
Daniel G. Sorber,
INVENTOR.
BY J. Stanley Burch
ATTORNEY.

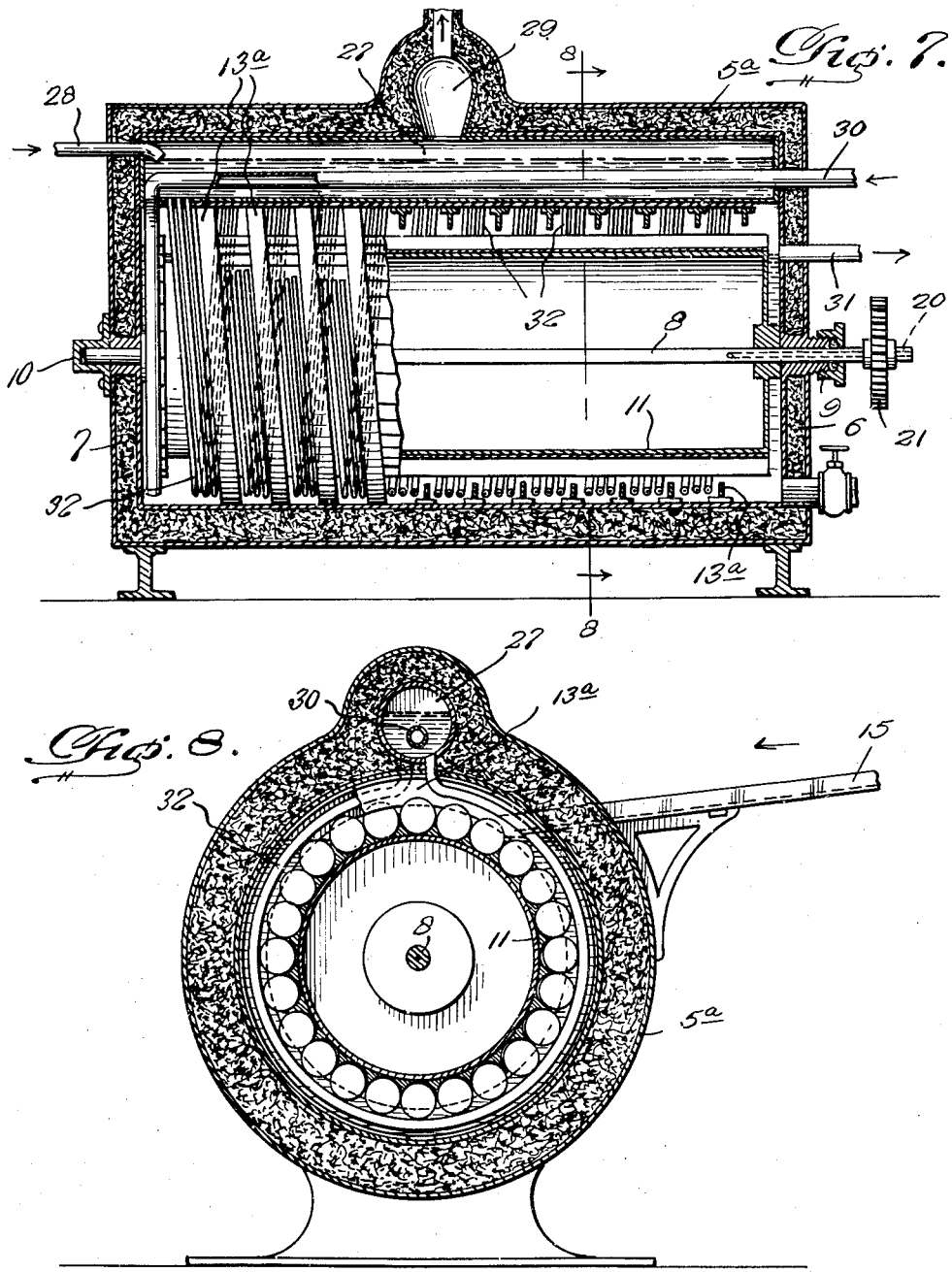

Dec. 19, 1933.    D. G. SORBER    1,940,192
APPARATUS FOR FREEZING CANNED GOODS
Filed Nov. 9, 1931    5 Sheets-Sheet 5
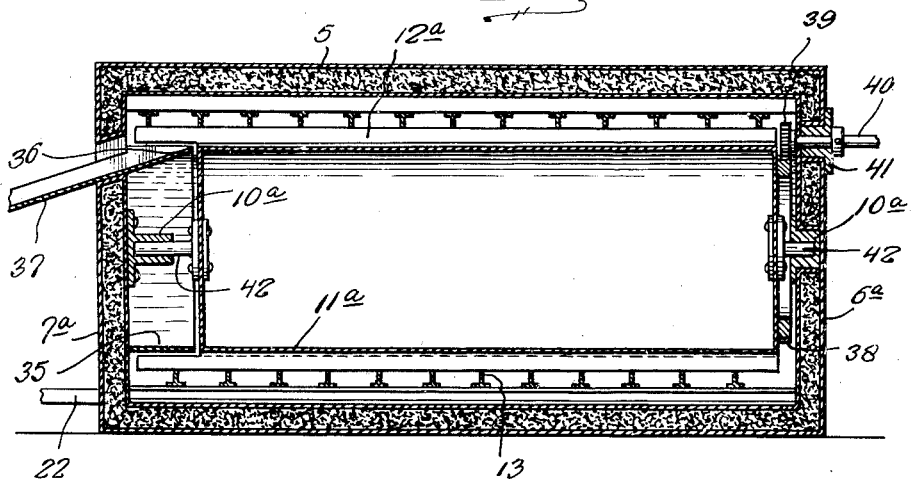
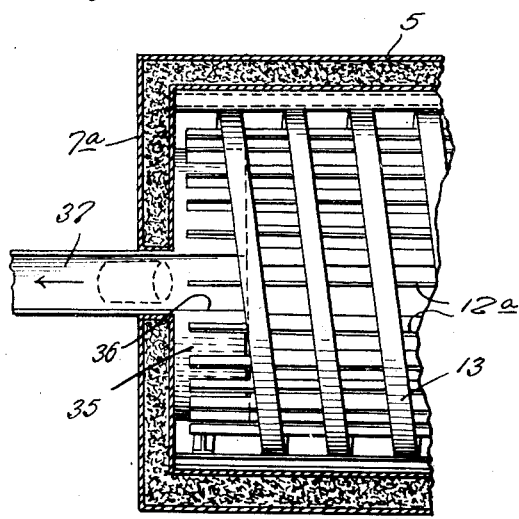
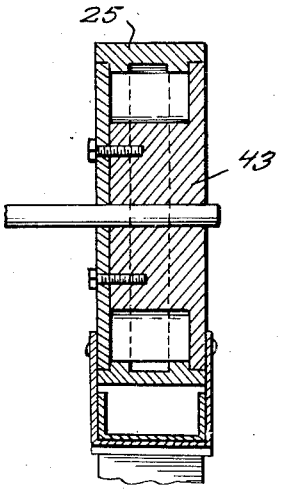
Daniel G. Sorber,
INVENTOR.
BY J. Stanley Burch
ATTORNEY.

Patented Dec. 19, 1933

1,940,192

UNITED STATES PATENT OFFICE 1,940,192

APPARATUS FOR FREEZING CANNED GOODS

Daniel G. Sorber, El Monte, Calif.

Application November 9, 1931. Serial No. 573,973

8 Claims. (Cl. 62—104)

This invention relates to a novel apparatus for freezing canned goods to be stored and marketed in a frozen condition.

The primary object of the present invention is to provide an apparatus of the above kind which is efficient and continuous in operation, and which may be economically manufactured and placed in practical use.

Another object of the present invention is to provide a machine or apparatus of the above kind within which an intensely cold condition is produced and through which the products to be frozen are passed, thereby effecting a close-coupled transfer of heat.

A further object is to provide a self-contained apparatus for effecting a direct transfer of heat from the product being frozen to the refrigerating system.

Other objects and features of the invention will become apparent from the following description when considered in connection with the accompanying drawings, in which:

Figure 1 is a top plan view of one form of apparatus embodying the present invention.

Figure 2 is a central longitudinal section thereof.

Figure 3 is a transverse section on line 3—3 of Figure 1.

Figure 4 is a transverse section on line 4—4 of Figure 1.

Figure 5 is a fragmentary horizontal section on line 5—5 of Figure 4.

Figure 6 is an enlarged fragmentary longitudinal section on line 6—6 of Figure 4.

Figure 7 is a view somewhat similar to Figure 2 of a modified form of apparatus embodying the present invention.

Figure 8 is a transverse section on line 8—8 of Figure 7.

Figure 9 is an enlarged transverse section of the rotary cylinder forming part of the apparatus shown in Figures 7 and 8.

Figure 10 is a view similar to Figure 7 of a further modification of the present invention.

Figure 11 is a detail horizontal sectional view of the discharge end of the machine shown in Figure 10; and Figure 12 is an enlarged transverse vertical section on line 12—12 of Figure 4.

The present apparatus or machine may comprise a heat insulated tank or casing having an outer wall 5 closed by end walls or heads 6 and 7. Suitably journaled in the heads 6 and 7 is an axially disposed shaft 8 which extends outwardly through a stuffing box 9 on the head 6 and is journaled in a bearing 10 on the head 7. Upon the shaft 8 within the tank or casing 5 is secured a cylinder 11 to the periphery of which are secured longitudinally disposed angle bars 12, one angle of each of which projects radially of the shaft 8 and cylinder or drum 11. This cylinder, with the bars 12, constitute a rotary carrier or conveyor within the tank or casing by means of which the cans are moved around in the tank or casing as hereinafter explained. Arranged within the tank or casing and secured to the internal wall thereof is a helical guide rail 13 which extends from one end of the tank or casing to the other end thereof. It will be noted that the cylinder 11 with its annular series of rails or bars 12 constitutes a rotating can-path component which lies concentrically within the helical rail 13, which is the fixed can-path component.

The tank or casing 5 has a can inlet 14 near one end and near the top thereof, and inclined rails 15 extend through this inlet to feed the cans by gravity from a suitable source onto the cylinder 11 at the top of the latter. The cans enter between adjacent bars 12 on the cylinder 11, and are carried around with said bars as the cylinder rotates, the spiral guide rail 13 causing the cans to slide endwise of the cylinder 11 until eventually the cans reach a point adjacent the other end of the tank or casing. At this other end, the tank or casing 5 is provided with an outlet 16 through which a chute 17 projects for conducting the cans from the cylinder 11 to a suitable point of discharge. Suitable means may be provided for discharging the cans from the cylinder 11 as they arrive at the top of the tank or casing 5 adjacent the chute 17. For this purpose, the radial flanges of the bars 12 may be notched as at 18, and the inner end of the chute 17 may carry a projecting narrow tongue 19 adapted to engage under the cans as they arrive at the point of discharge so as to cause them to ride onto the discharge chute 17, the notches at 18 accommodating the tongue 19 so that it may function in this manner.

The cylinder 11 is preferably constructed so as to be airtight with the exception of a vent passage 20 in one end of the shaft 8 communicating with the interior of cylinder 11 and opening to the atmosphere, thus allowing air to pass freely into and out of the cylinder 11 so as to equalize the pressure within and outside of the cylinder 11, as the temperature of the cylinder is changed. Power is applied to shaft 8 for rotating the drum 11 by suitable means, such as a drive wheel 21 fastened upon the projecting end of said shaft 8.

In order to thoroughly freeze the contents of the cans, I subject the latter to the action of a refrigerant bath as they move with and along the carrier or cylinder 11. For this purpose, a suitable refrigerant is maintained within the tank or casing 5 to a level slightly below the can inlet 14 and the can outlet 16, as well as approximately to the top of the cylinder 11. An inlet 22 for this refrigerant is provided in the end wall 7, and an outlet for the refrigerant is provided in the end wall 6 as at 23, the refrigerant being pumped into the bottom of tank 5 through the inlet 22 and out of the tank 5 through the outlet 23 so that the refrigerant flows in a direction opposite to that of the cans passing from the can inlet 14 to the can outlet 16. The refrigerant is suitably cooled before being pumped back into the tank 5 so that the heat is removed from the refrigerant to some extent during the circulation thereof. However, the temperature is mainly lowered by providing absorption coils of a suitable refrigerating system, as at 24, within the tank or casing 5 and so as to be submerged in the cooling bath below and at opposite sides of the cylinder 11. The refrigeration system may be of a one or two stage type, and if a two stage system is used, the first may be an ammonia cycle, and the second may be one using carbon dioxide or a suitable refrigerant that remains in a liquid state at very low temperature and that is delivered directly to the coils 24 where it will absorb the heat from the products being frozen through the medium of the cooling bath. This liquid refrigerant will then vaporize and pass back to the compressor of the system. As such refrigerating systems are generally well known, only the absorption coils 24 are illustrated herein. The refrigerant or cooling bath may be provided by either a brine solution or alcohol. When alcohol is used as a cooling bath, the cans, upon leaving the apparatus, may pass through a vacuum chamber 25 so that the alcohol may be removed from the cans and condensed for re-use in the apparatus.

It will be noted that the spaced bars 12 provide, in effect, an annular series of grooves on the periphery of the cylinder 11 for reception of the cans. As shown in Figure 9, such annular series of grooves may be formed by applying to the exterior of the cylinder 11 a corrugated sheet metal cylinder 26. This latter construction is preferably employed when the apparatus is constructed as shown in Figures 7 and 8.

In the embodiment of the invention illustrated in Figures 7 and 8, the tank or casing 5a is of cylindrical form, and the helical guide rail 13a is secured directly to the inner surface thereof. By thus making the tank or casing conform to the cylinder 11, the volume of cooling or refrigerant bath is reduced to a minimum, a condition which is quite desirable when alcohol is the refrigerant used for the bath. The tank or casing 5a is provided with a longitudinal expansion and accumulator chamber 27, preferably at the top, into which the liquid refrigerant of the refrigerating system is forced, said chamber 27 having an inlet 28 at one end and an outlet dome 29. Further, the inlet pipe 30 for the refrigerant constituting the cooling or refrigerating bath within the tank or casing 5a extends longitudinally through this header or accumulator chamber 27 so that maximum cooling of the refrigerant for the bath is effected before it is discharged into the tank or casing 5a. The refrigerant for the bath is pumped from the tank 5a through the outlet 31, and the absorption coils of the refrigerating system consist of a longitudinal series of helical coil sets, each set including a plurality of parallel coil elements 32 extending once around the cylinder 11 and connecting at its ends with the header or accumulator chamber 27. As shown, the coil elements 32 extend within and between adjacent convolutions of the spiral guide rail 13a in surrounding relation to the cylinder 11 so as to have direct contact with the outer sides of the cans as they are fed through the apparatus. Otherwise, the construction of Figures 7 and 8 is the same as that previously described in connection with Figures 1 to 6 inclusive in essential respects, and like reference numerals are used to indicate similar parts involved in both forms of the apparatus and not specifically dealt with in the specific description of Figures 7 and 8.

As before stated, the machine is especially designed for freezing food products after they are sealed up in cans. In operation, the outer tank or casing is filled with a refrigerant up to a level or point slightly below the can inlet and outlet, and such refrigerant is circulated through the tank or casing in a direction from the end of the tank or casing where the cans are discharged, toward the end of the tank or casing where the cans are fed into the machine, or in a direction reverse to the direction of travel of the cans through the apparatus. The refrigerant is of course suitably cooled before being returned to the tank or casing. The cans roll on the tracks 15 through the inlet 14 onto the drum 11 between adjacent bars 12 at the top of the cylinder 11, or into grooves provided on the periphery of the cylinder 11 as shown in Figure 9. As the cans come into contact with the spiral guide rail 13 or 13a, they are forced along endwise of the cylinder 11 as it revolves, toward the discharge 16, finally passing onto the tongue 19 and rolling along the chute 17 to the point of discharge or delivery. During travel of the cans through the tank or casing 5, heat is absorbed from the same and their contents by the bath of refrigerant within said tank or casing, heat being absorbed from the bath mainly by the absorption coil 24 or coil elements 32. In this way, the contents of the cans are effectively frozen by the time such cans have travelled the full length of the tank or casing and before being discharged from the latter.

Referring to Figures 10 and 11, the head 7a has an internal annular flange 35, and the bars 12a carried by cylinder 11a project beyond the adjacent end of the latter in surrounding relation to the flange 35 and have the inner web or flange portions of their projecting ends removed. Thus, the cans may pass onto and roll upon the flange 35 when they reach the end of the cylinder 11a adjacent head 7a. The flange 35 is provided at the top with a discharge slot 36 which communicates with a discharge spout or chute 37 extending out of the head 7a so that the cans are discharged by gravity at this point. A ring gear 38 may be fixed to the opposite end of cylinder 11a and a pinion 39 may mesh with the top thereof, the pinion 39 being carried by a drive shaft 40 extending through a bearing 41 in the head 6a above the level of the refrigerant bath in the casing 5. In this way, internal bearings 10a may be provided in the casing for stub shafts 42 on the ends of drum or cylinder 11a, thus doing away with the necessity of stuffing box 9. Otherwise, the construction is similar to Figures 1 to 6 inclusive.

It will be noted that a very cold condition is produced directly within the chamber 27 by the expansion of the refrigerant therein, and that such chamber 27 is essentially a part of the machine or apparatus embraced by the casing 5a in Figures 7 and 8. The vacuum chamber 25 may have a suction pipe 25a in communication therewith, and the cans may be carried through this chamber by a rotatable carrier 43 having peripheral pockets 44 to receive the cans and suitably operated by power.

It will thus be seen that I have provided a simple and efficient device for continuously moving cans of goods through a cooling bath so that the temperature of the contents of the cans will be quickly lowered to a point where such contents are frozen solid. Minor changes are contemplated within the spirit and scope of the invention as claimed.

What I claim as new is:

1. In an apparatus for freezing canned goods, the combination of a substantially closed heat-insulated casing containing a relatively deep refrigerant bath and having a can inlet and a can outlet above the level of said bath, a can-path within said casing substantially completely below the level of said bath and composed of an annular series of pockets and a fixed helically directed rail concentric with and lying outside of said series, means for imparting axial rotation to said annular pockets to effect the advance of the cans through said path and below the level of said bath, means to feed the cans through said can inlet to said can path, and means to discharge the cans from said can path through said can outlet after passing through said path.

2. An apparatus for freezing canned goods comprising a substantially closed heat-insulated tank having a relatively deep refrigerant bath therein and provided with an inlet and an outlet for the refrigerant at opposite ends thereof whereby the refrigerant will flow lengthwise of the tank, and means including a can carrier within said tank for moving a continuous series of the cans lengthwise of the tank through said refrigerant bath and below the level of the latter in a direction opposite to the flow of said refrigerant through said tank.

3. In an apparatus for freezing canned goods, the combination of a heat-insulated tank having a refrigerant bath therein, a can-path within said tank composed of an annular series of pockets and a fixed helically directed rail concentric with and lying outside of said pockets, means for imparting axial rotation to said pockets to effect the advance of the cans through said bath, and an inlet and an outlet for the refrigerant in said tank at opposite ends thereof, whereby the refrigerant will flow lengthwise of said tank in a direction opposite to the travel of the cans through said path.

4. In an apparatus for freezing canned goods, a heat-insulated tank having a refrigerant therein and provided with an interior spiral can guide extending from the feed to the discharge end thereof, a rotatable carrier in said tank adapted to receive the cans and compel them to turn with the carrier while the spiral can guide compels the cans to move lengthwise of the carrier through said refrigerant, said tank having an inlet and an outlet for the refrigerant at opposite ends thereof to provide a constant supply of cold refrigerant and to cause it to flow in a direction opposite to the movement of the cans relative to the carrier.

5. In an apparatus for freezing canned goods, a cylindrical heat-insulated tank having an interior spiral can guide extending from the feed to the discharge end thereof, a rotatable carrier in said tank adapted to receive the cans and compel them to turn with the carrier while the spiral compels the cans to move lengthwise of the carrier, said tank further having a longitudinal expansion and accumulator chamber provided with an inlet and an outlet for a compressed refrigerant, and absorption coils including sets of helical coil elements surrounding the carrier within and between adjacent convolutions of the spiral can guide and connected at their ends with the expansion and accumulator chamber.

6. In an apparatus for freezing canned goods, a cylindrical heat-insulated tank having an interior spiral can guide extending from the feed to the discharge end thereof, a rotatable carrier in said tank adapted to receive the cans and compel them to turn with the carrier while the spiral compels the cans to move lengthwise of the carrier, said tank further having a longitudinal expansion and accumulator chamber provided with an inlet and an outlet for a compressed refrigerant, and absorption coils including sets of helical coil elements surrounding the carrier within and between adjacent convolutions of the spiral can guide and connected at their ends with the expansion and accumulator chamber, said tank further having a refrigerant therein and provided with an inlet and an outlet for the refrigerant at opposite ends thereof whereby the refrigerant may flow through the tank in a direction opposite to that in which the cans travel through the tank.

7. In an apparatus for freezing canned goods, a cylindrical heat-insulated tank having an interior spiral can guide extending from the feed to the discharge end thereof, a rotatable carrier in said tank adapted to receive the cans and compel them to turn with the carrier while the spiral compels the cans to move lenthwise of the carrier, said tank further having a longitudinal expansion and accumulator chamber provided with an inlet and an outlet for a compressed refrigerant, and absorption coils including sets of helical coil elements surrounding the carrier within and between adjacent convolutions of the spiral can guide and connected at their ends with the expansion and accumulator chamber, said tank further having a refrigerant therein and provided with an inlet and an outlet for the refrigerant at opposite ends thereof whereby the refrigerant may flow through the tank in a direction opposite to that in which the cans travel through the tank, said refrigerant inlet extending longitudinally through the expansion and accumulator chamber before opening into the tank.

8. In an apparatus for freezing canned goods or the like, a heat-insulated casing having a refrigerant therein to provide a bath, means for circulating the refrigerant through said casing, means for passing cans continuously through said casing and the refrigerant bath therein, absorption coils in said casing for lowering the temperature of said bath, and means including a heat insulated expansion chamber in said casing for expanding a compressed refrigerant and supplying the expanded refrigerant to said coils.

DANIEL G. SORBER.